US012737004B2

(12) United States Patent
Hsieh et al.

(10) Patent No.: US 12,737,004 B2
(45) Date of Patent: Sep. 15, 2026

(54) FOLDABLE ELECTRONIC DEVICE

(71) Applicant: Acer Incorporated, New Taipei City (TW)

(72) Inventors: Hua-Feng Hsieh, New Taipei City (TW); Shun-Bin Chen, New Taipei City (TW); Chun-Hsien Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 92 days.

(21) Appl. No.: 18/976,380

(22) Filed: Dec. 11, 2024

(65) Prior Publication Data

US 2025/0341860 A1 Nov. 6, 2025

(30) Foreign Application Priority Data

May 6, 2024 (TW) ................................ 113116707

(51) Int. Cl.
*G06F 1/16* (2006.01)
*H05K 5/00* (2025.01)
*H05K 7/00* (2006.01)

(52) U.S. Cl.
CPC .................................. *G06F 1/1618* (2013.01)

(58) Field of Classification Search
CPC .... G06F 1/1618; G06F 1/1616; G06F 1/1615; G06F 1/1652; G06F 1/1622
See application file for complete search history.

(56) References Cited

U.S. PATENT DOCUMENTS 11,216,043 B1 * 1/2022 Holung ................. G06F 1/1635
2017/0168631 A1 * 6/2017 Roberts-Hoffman ........................ G06F 3/04883
2017/0220077 A1 * 8/2017 Holung ................. G06F 1/1616
2019/0163241 A1 * 5/2019 Moon ................... G06F 1/1681
2019/0258295 A1 * 8/2019 Fujimoto .................. G09F 9/00
2019/0383073 A1 * 12/2019 Zhu ....................... G06F 1/1654
2020/0019217 A1 * 1/2020 Larsen .................. G06F 1/1679
2021/0041912 A1 * 2/2021 Eom ....................... G06F 3/017
2021/0405693 A1 * 12/2021 Holung ................. G06F 1/1681
2022/0035418 A1 * 2/2022 Holung ................. G06F 1/1618
2022/0037941 A1 * 2/2022 Holung .................... H02K 1/27

FOREIGN PATENT DOCUMENTS

CN 214311504 9/2021
CN 218298871 1/2023

* cited by examiner

*Primary Examiner* — Anthony M Haughton
(74) *Attorney, Agent, or Firm* — JCIPRNET

(57) ABSTRACT

Disclosed is a foldable electronic device including a first body, a first magnet disposed in the first body, a second body, a hinge connected to the first body and the second body, a counterweight wheel pivoted to the second body, a carrier pivoted to the second body, and a second magnet disposed in the carrier. The first body and the second body are rotated relatively by the hinge to be folded or unfolded and converted between a 0-degree state and a 360-degree state. An end portion of the counterweight wheel is connected to the carrier, the pivot joint between the counterweight wheel and the second body is eccentric to a gravity center of the counterweight wheel, and is located between the end portion and the gravity center. The counterweight wheel rotates by gravity in response to a posture of the second body.

10 Claims, 9 Drawing Sheets

FOLDABLE ELECTRONIC DEVICE

CROSS-REFERENCE TO RELATED APPLICATION

This application claims the priority benefit of Taiwan application serial no. 113116707, filed on May 6, 2024. The entirety of the above-mentioned patent application is hereby incorporated by reference herein and made a part of this specification.

BACKGROUND

Technical Field

The disclosure relates to a foldable electronic device.

Description of Related Art

With the advancement of hinge technology, existing foldable electronic devices, such as laptops, can easily be folded and unfolded, and the screen relative to the host is flipped and abuts against the other side of the host, thereby making the laptop be converted into a tablet mode to increase usage scenarios.

For the laptop, how to keep the screen folded and unfolded on the host, or how to keep the screen attached to the back of the host after the screen is flipped to the back of the host, has become a problem that the inventor needs to improve. After all, in the aforementioned usage state, if there are no additional fasteners to fix the first and second bodies together, the instability of the bodies may result inconvenience to the user.

For the aforementioned usage states, because the screen needs to abut different surfaces of the host, different mechanisms are usually disposed for different surfaces, which obviously leads to configuration problems of these different mechanisms, and hinders the design of the body in a trend becoming thin, light, and short.

SUMMARY

The disclosure provides a foldable electronic device, which has a movable magnetic component to adapt to different folding postures of a body.

A foldable electronic device of the disclosure includes a first body, a first magnet, a second body, a hinge, a counterweight wheel, a carrier, and a second magnet. The first magnet is disposed in the first body. The hinge is connected to the first body and the second body, so that the first body and the second body are rotated relatively by the hinge to be folded and unfolded, and are converted between a 0-degree state and a 360-degree state. In the 0-degree state, the first body is stacked on an upper surface of the second body, and the first magnet is adjacent to the upper surface and away from a lower surface of the second body. In the 360-degree state, the first body is stacked on the lower surface, the first magnet is adjacent to the lower surface and away from the upper surface, and the upper surface and the lower surface are two opposite surfaces of the second body. The counterweight wheel and the carrier are respectively pivoted to the second body. An end portion of the counterweight wheel is connected to the carrier. A pivot joint between the counterweight wheel and the second body is eccentric to a gravity center of the counterweight wheel, and is located between the end portion and the gravity center. The second magnet is disposed in the carrier. The counterweight wheel is rotated in the second body by gravity in response to a posture of the second body, and drives the carrier and the second magnet to rotate in the second body. In a process of being converted from the 0-degree state to the 360-degree state, the counterweight wheel drives the second magnet to move away from the upper surface and move closer to the lower surface. In a process of being converted from the 360-degree state to the 0-degree state, the counterweight wheel drives the second magnet to move away from the lower surface and move closer to the upper surface, so that the first magnet and the second magnet move closer to each other to generate a magnetic attracting force.

Based on the above, the foldable electronic device is equipped with a rotatable counterweight wheel in the body, and the pivot joint between the counterweight wheel and the body is eccentric to the gravity center of the counterweight wheel, so that the counterweight wheel is rotated by gravity in response to the posture of the body. Furthermore, the foldable electronic device is further equipped with a rotatable carrier in the body, and the second magnet is disposed in the carrier, so that the end portion of the counterweight wheel is connected to the carrier. Accordingly, the rotational motion of the counterweight wheel is able to drive the carrier to rotate, thereby making the second magnet on the carrier move closer to or move away from the two opposite surfaces of the body. At the same time, with another magnet disposed in another body, the foldable electronic device is able to make the movement of the magnet to match the folding and unfolding angle of the body and the corresponding other magnet, so that the two magnets may approach each other and generate the magnetic attracting force. Therefore, when the body is in different folding states, enough magnetic attracting force attracts the body together without causing the body to fall apart.

DESCRIPTION OF THE EMBODIMENTS

Figure 1:
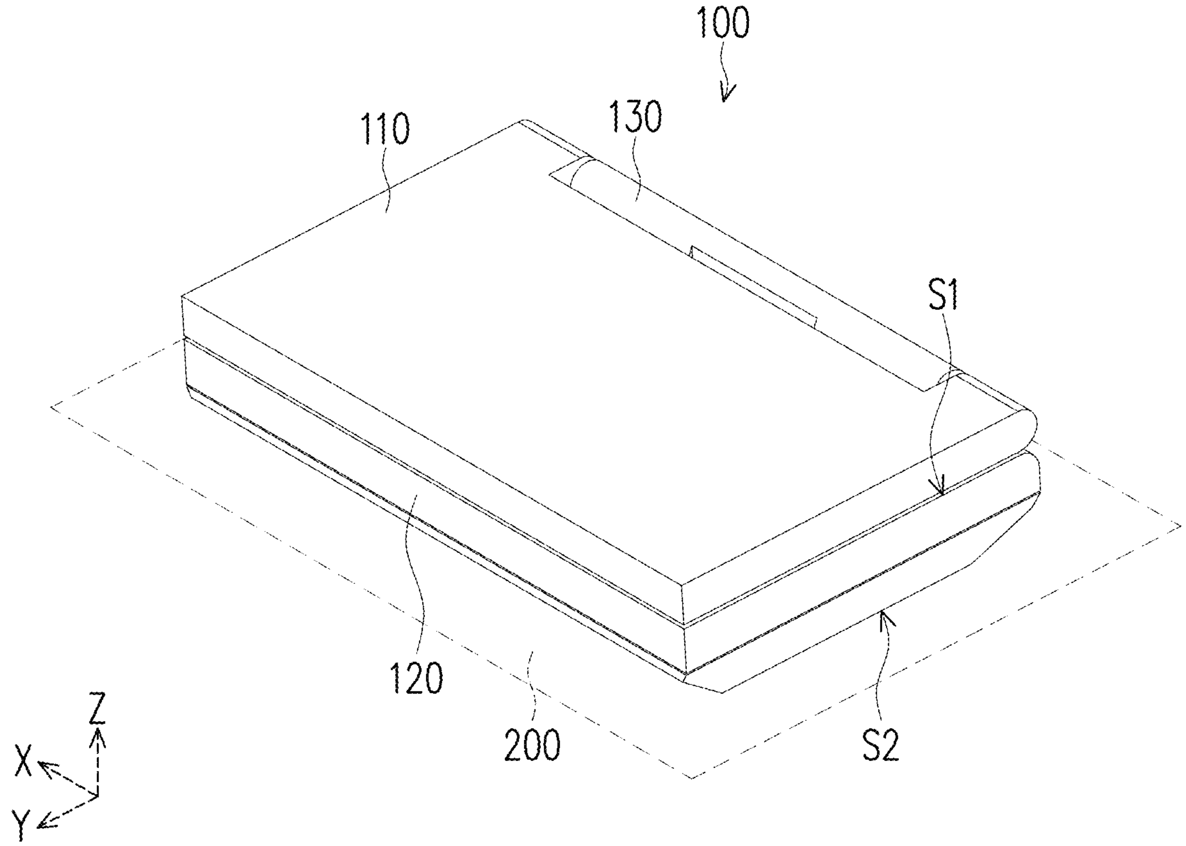
FIG. 1 is a schematic view of a foldable electronic device according to an embodiment of the disclosure.
Figure 2:
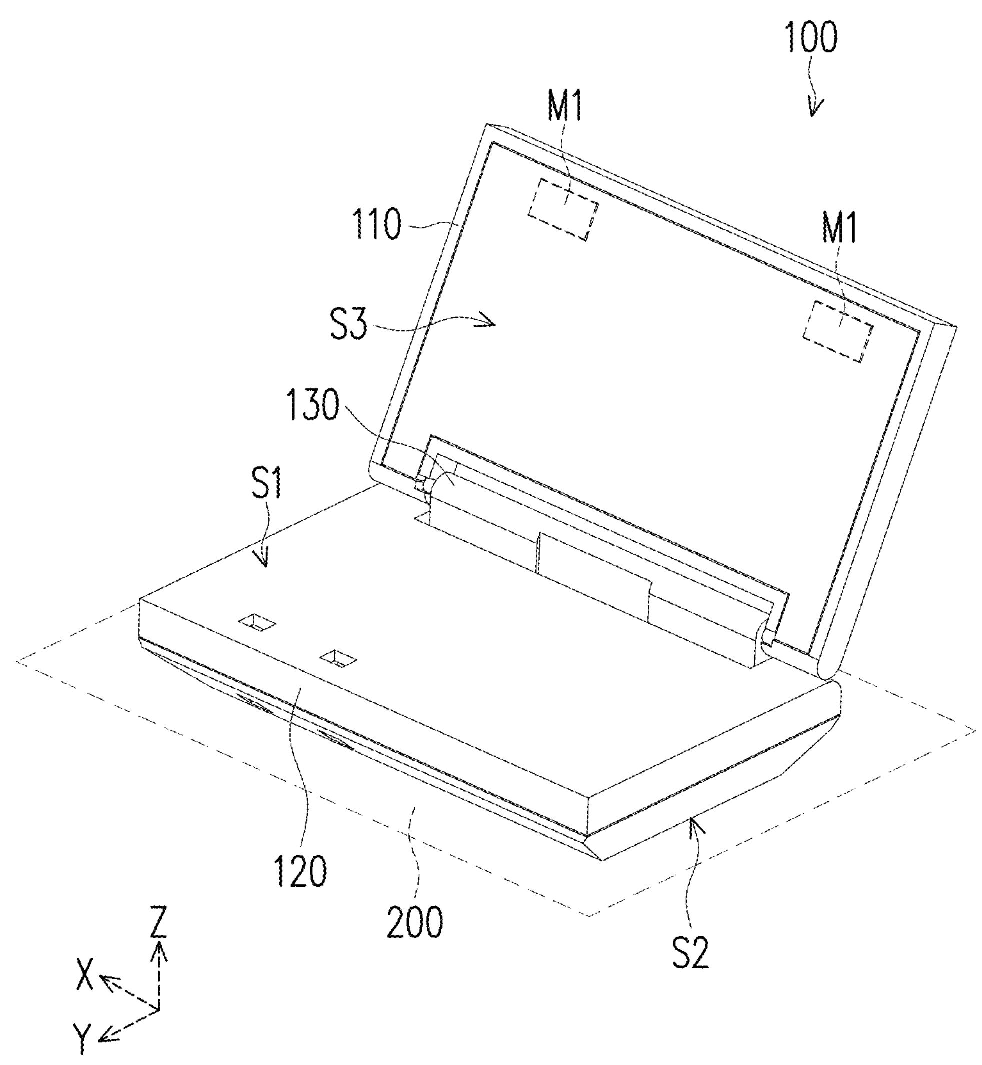
FIG. 2 is another state of a foldable electronic device.

FIG. 1 is a schematic view of a foldable electronic device according to an embodiment of the disclosure. FIG. 2 is another state of a foldable electronic device. Please refer to FIG. 1 and FIG. 2 at the same time. In this embodiment, a foldable electronic device 100, taking a laptop as an example, includes a first body 110, a second body 120, and a hinge 130. The hinge 130 is connected between the first body 110 and the second body 120, so that the first body 110 and the second body 120 may be rotated relatively by the hinge 130 to be folded or unfolded. Here, the foldable electronic device 100 is placed on a platform 200 and is converted into different postures accordingly. At the same time, a surface of the platform 200 is used as an X-Y plane of rectangular coordinates X-Y-Z to facilitate subsequent descriptions.

Figure 3A:
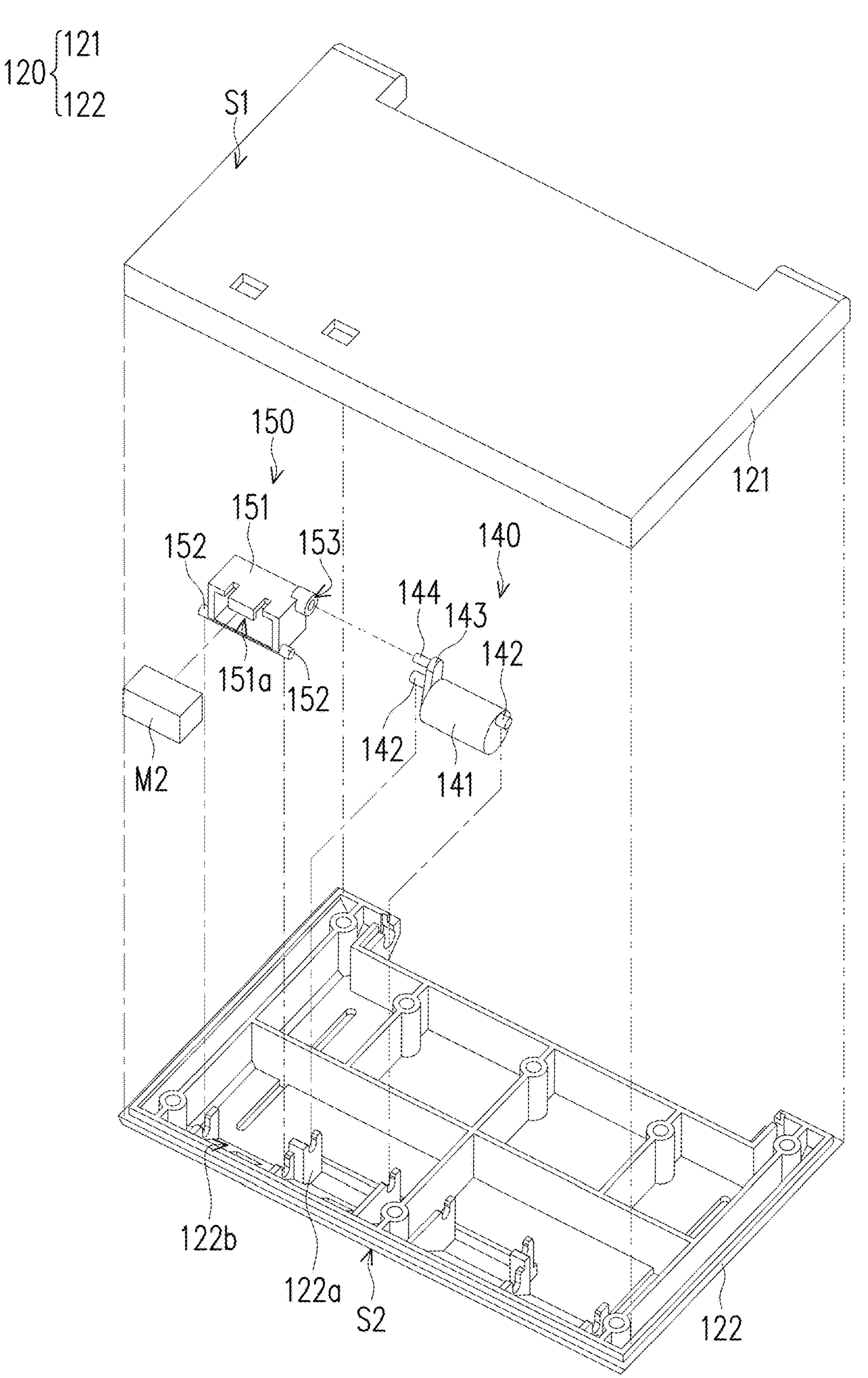
FIG. 3A is an exploded view of some components of a foldable electronic device.
Figure 3B:
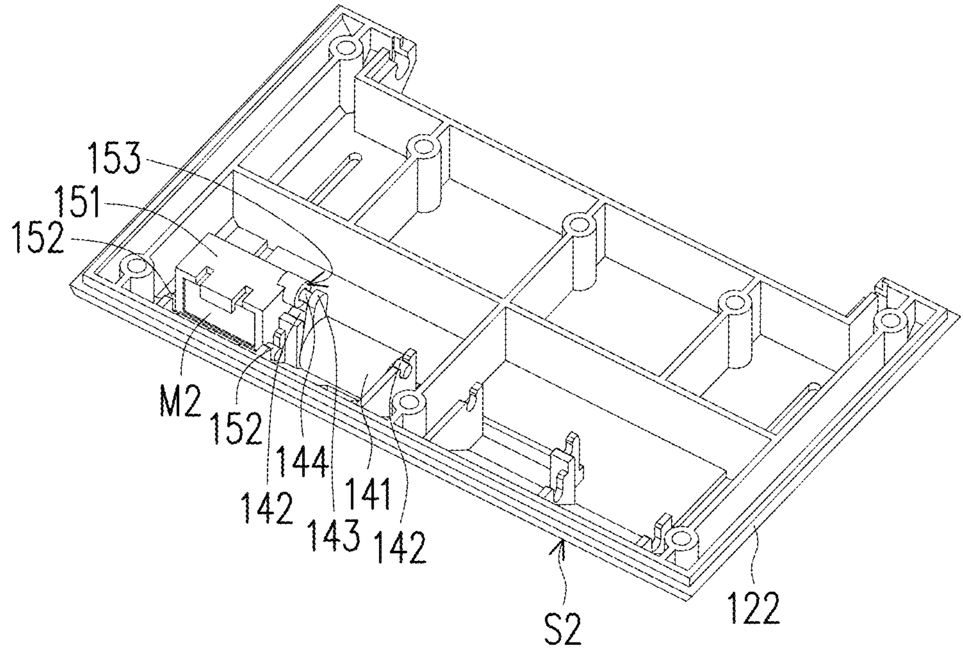
FIG. 3B is a schematic view of some components in FIG. 3A after assembly.

FIG. 3A is an exploded view of some components of a foldable electronic device. FIG. 3B is a schematic view of some components in FIG. 3A after assembly. Please refer to FIG. 2, FIG. 3A, and FIG. 3B at the same time. In this embodiment, the foldable electronic device 100 further includes a first magnet M1, a counterweight wheel 140, a carrier 150, and a second magnet M2. The second body 120 is composed of a case 121 and a case 122. The first magnet M1 is disposed in the first body 110. The counterweight wheel 140 is pivoted to the second body 120. A pivot joint between the counterweight wheel 140 and the second body 120 is eccentric to a gravity center C1 of the counterweight wheel 140, so the counterweight wheel 140 may generate a rotational motion by gravity G (self-weight) in response to a posture of the second body 120, which is further described in subsequent figures.

Further, the counterweight wheel 140 includes a wheel 141, a pivot shaft 142, a connecting arm 143, and an end portion 144. The wheel 141 is pivoted to a pair of vertical walls 122*a* on an inner surface of the case 122 by a pair of pivot shafts 142. The connecting arm 143 extends from a circular side surface of the wheel 141 and protrudes outside the wheel 141. The end portion 144 is cylindrical and extends from a part of the connecting arm 143 away from a part of the wheel 141. The carrier 150 includes a box-shaped body 151. The body 151 has a space 151*a* to accommodate the second magnet M2. A pair of pivot shafts 152 of the carrier 150 extend from opposite sides of the body 151 and are pivoted to a pair of pillars on the inner surface of the case 122. The end portion 144 on the connecting arm 143 is substantially connected to the recessed hole 153 on a side surface of the body 151.

As shown in FIG. 3B, after the counterweight wheel 140 and the carrier 150 are assembled to the inner surface of the case 122, a pivot shaft of the counterweight wheel 140 and the second body 120 (the case 122), a pivot shaft of the carrier 150 and the second body 120 (the case 122), a pivot shaft of the end portion 144 and the carrier 150 are formed, and three pivot shafts are parallel to and different form each other. Accordingly, the rotational motion of the counterweight wheel 140 may drive the carrier 150 to rotate by the connecting arm 143, the end portion 144, and the recessed hole 153, where the end portion 144 is essentially pivoted to the recessed hole 153 of the carrier 150.

Figure 4A:
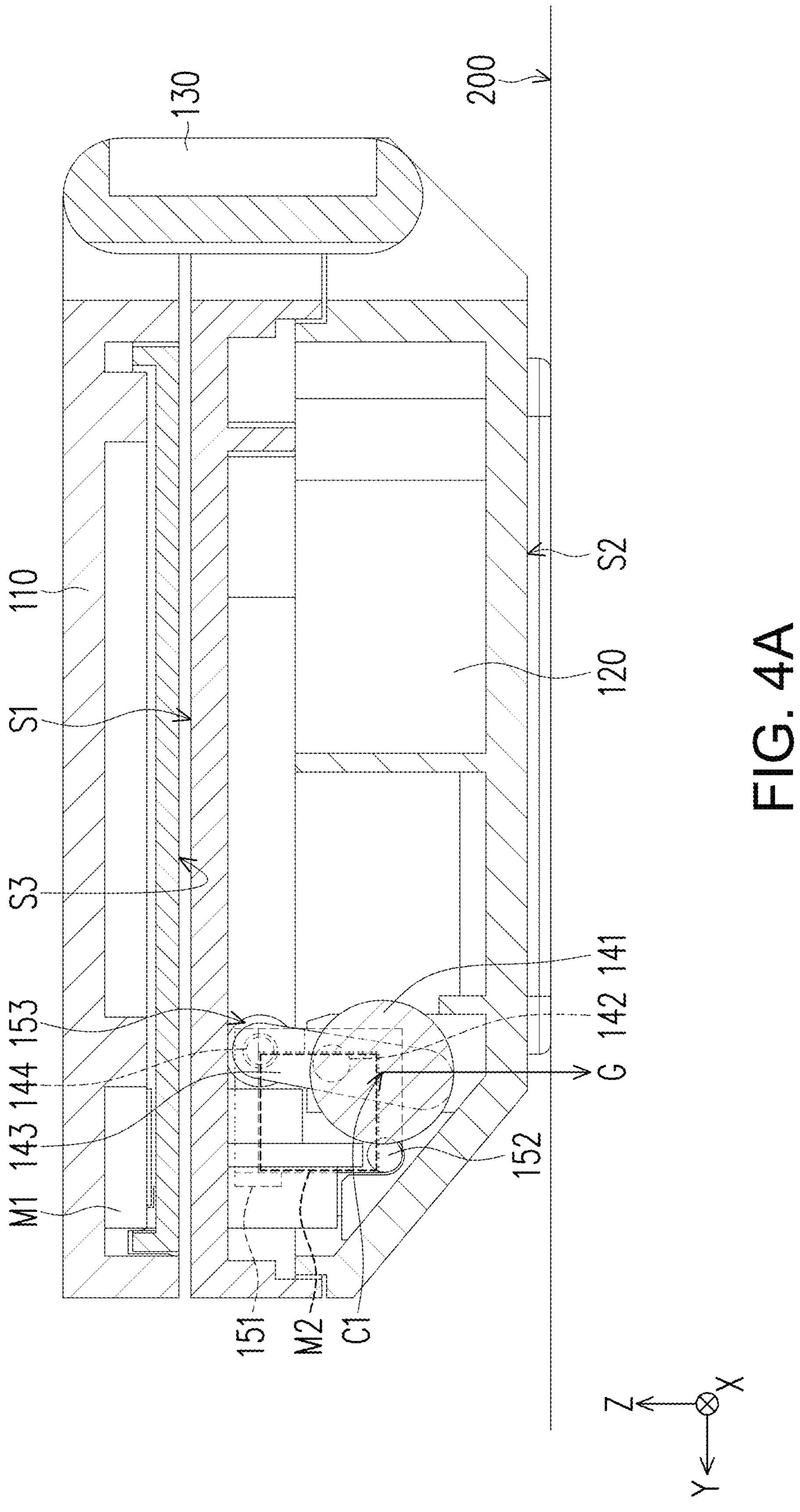
FIG. 4A is a cross-sectional view of a foldable electronic device in a 0-degree state.
Figure 4B:
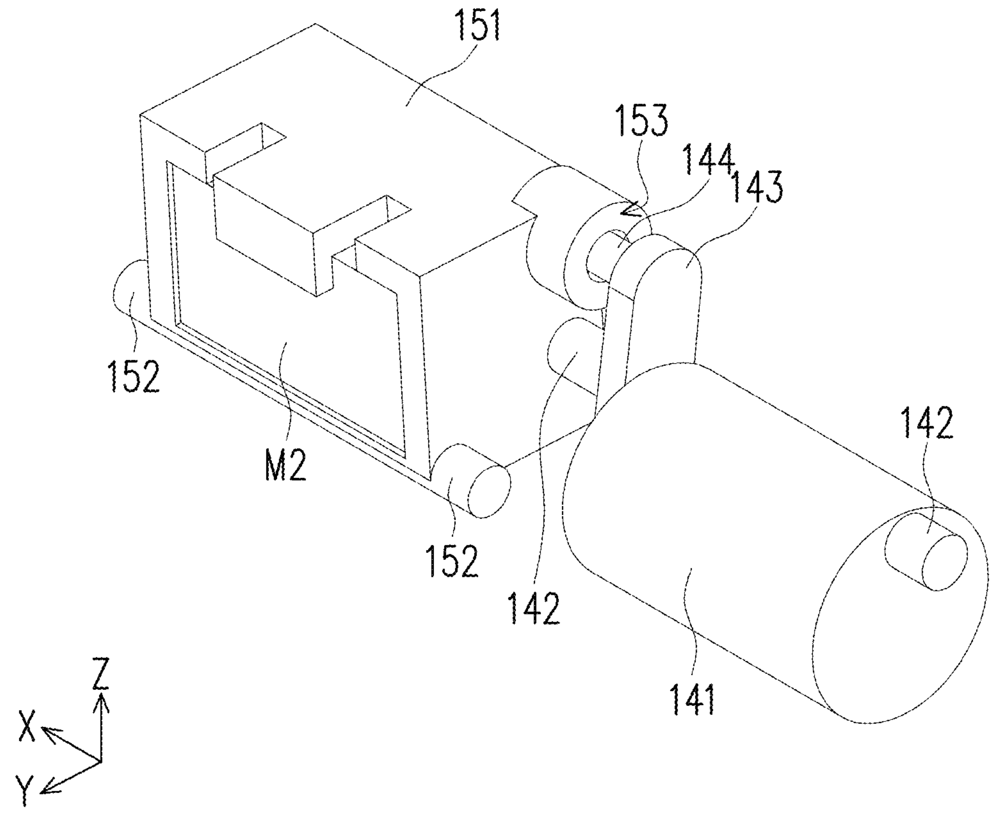
FIG. 4B is a schematic view of some components of a foldable electronic device in a 0-degree state.
Figure 5A:
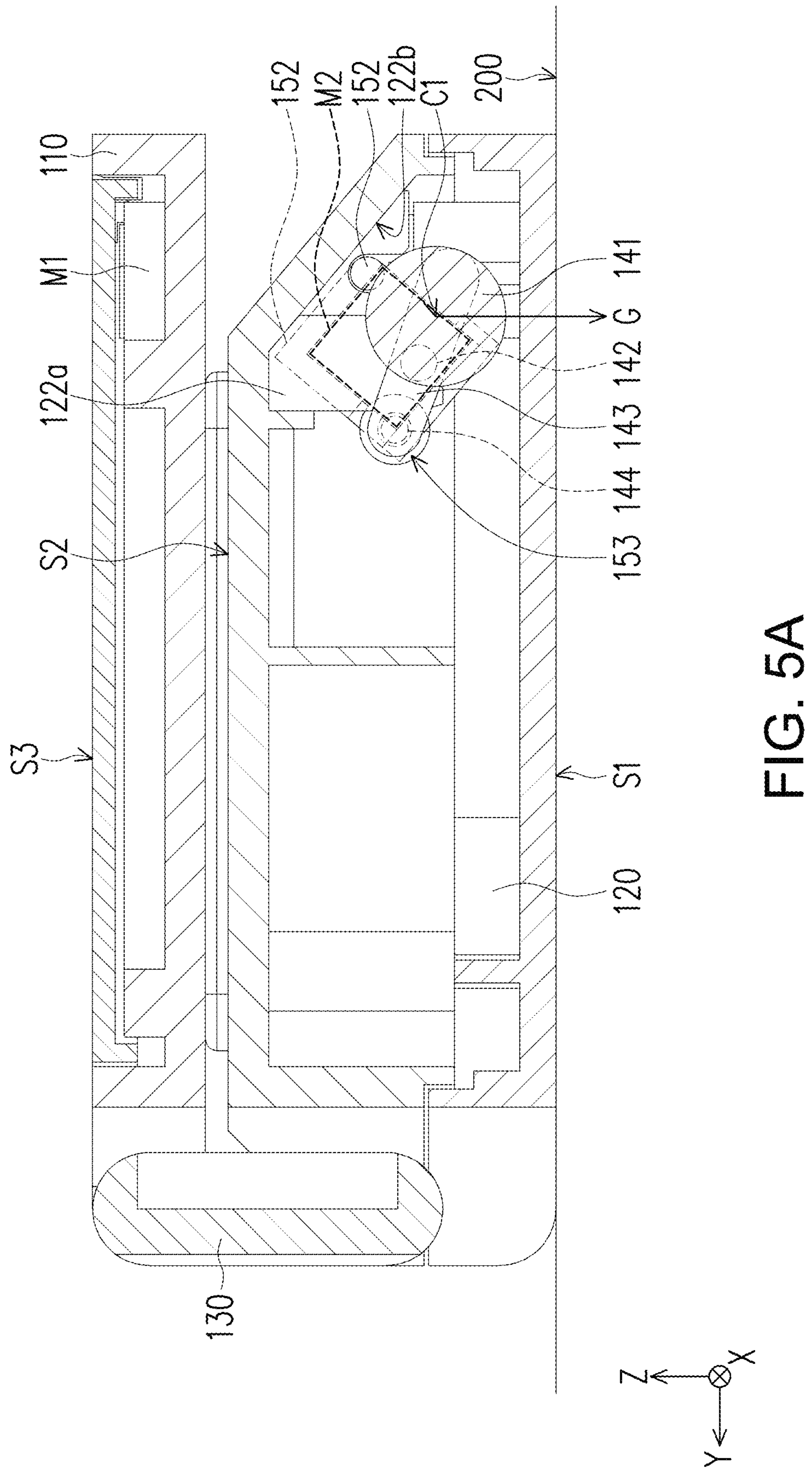
FIG. 5A is a cross-sectional view of a foldable electronic device in a 360-degree state.
Figure 5B:
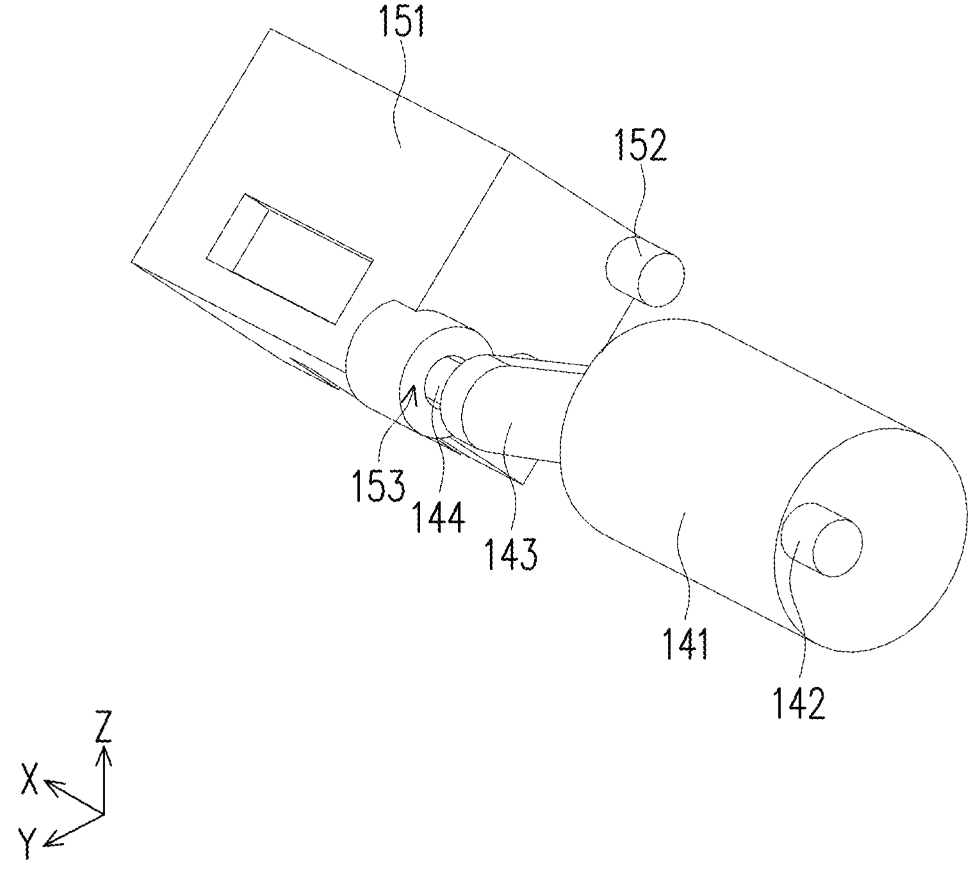
FIG. 5B is a schematic view of some components of a foldable electronic device in a 360-degree state.

FIG. 4A is a cross-sectional view of a foldable electronic device in a 0-degree state. FIG. 4B is a schematic view of some components of a foldable electronic device in a 0-degree state. FIG. 5A is a cross-sectional view of a foldable electronic device in a 360-degree state. FIG. 5B is a schematic view of some components of a foldable electronic device in a 360-degree state. Please refer to FIG. 1, FIG. 4A, and FIG. 4B, which illustrate the foldable electronic device 100 in the 0-degree state. The second body 120 has an upper surface S1 and a lower surface S2 opposite to each other. At this time, the second body 120 abuts the platform 200 by the lower surface S2. The first body 110 and a display surface S3 of a screen of the first body 110 are stacked on the upper surface S1 of the second body 120.

As shown in FIG. 4A and FIG. 4B, the pivot joint (that is, the pivot shaft 142) between the counterweight wheel 140 and the second body 120 is located between the end portion 144 and the gravity center C1 (G shown in the figure is gravity) of the counterweight wheel 140, so in the 0-degree state and under the influence of gravity G, the connecting arm 143 and the end portion 144 are located above the pivot shaft 142, and the gravity center C1 is located below the pivot shaft 142. At this time, the second magnet M2 of the carrier 150 is adjacent to the first magnet M1 of the first body 110 to generate magnetic attracting force, and the magnetic attracting force may maintain the foldable electronic device 100 in a first folded state (in the 0-degree state).

Next, please refer to FIG. 5A and FIG. 5B, which show the foldable electronic device 100 in the 360-degree state. At this time, the first body 110 is stacked on the lower surface S2 of the second body 120, the display surface S3 of the first body 110 faces away from the second body 120, and the second body 120 abuts the platform 200 by the upper surface S1 for a change to make the lower surface S2 away from the platform 200, thereby forming a tablet mode of the foldable electronic device 100. At this time, the first magnet M1 moves with the first body 110 to a position adjacent to the lower surface S2. Correspondingly, in FIG. 5A, the gravity center C1 of the counterweight wheel 140 is located at the lower right of the pivot shaft 142, so that the end portion 144 moves to the upper left of the pivot shaft 142 and drives the carrier 150 to rotate, thereby making the second magnet M2 move closer to the first magnet M1 and generate the magnetic attracting force to maintain the first body 110 and the second body 120 in the 360-degree state.

Figure 6:
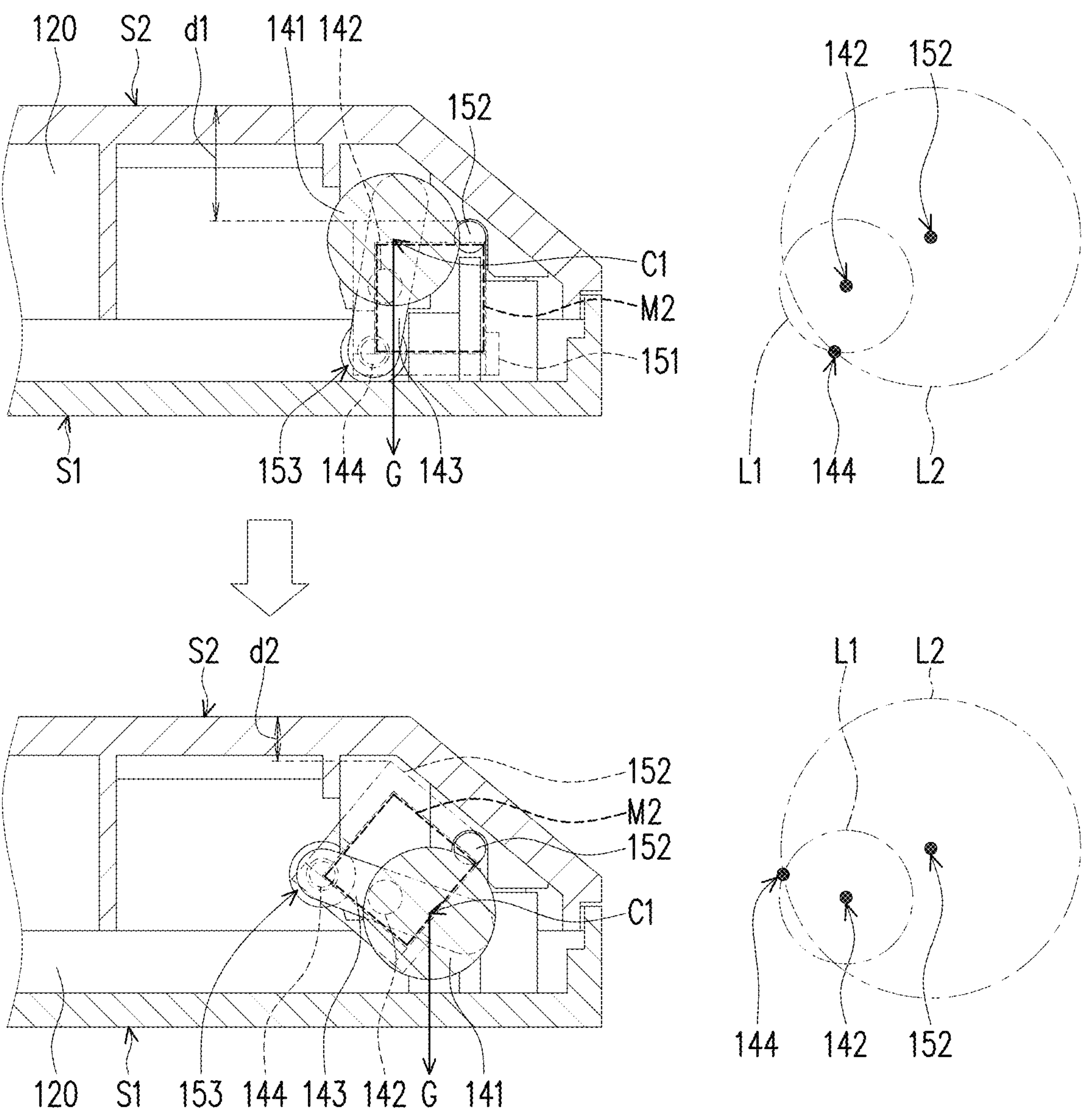
FIG. 6 is a schematic view of a conversion process from FIG. 4A to FIG. 5A.

FIG. 6 is a schematic view of a conversion process from FIG. 4A to FIG. 5A. Please refer to FIG. 6 in comparison with FIG. 4A or FIG. 5A. A top figure in FIG. 6 shows a moment after the second body 120 is flipped 180 degrees. At this time, the counterweight wheel 140 and the carrier 150 have not yet rotated, and a below figure in FIG. 6 is equivalent to FIG. 5A, that is, the state in which the counterweight wheel 140 and the carrier 150 have rotated. Accordingly, action characteristics of the counterweight wheel 140 and the carrier 150 may be clearly understood in FIG. 6. It should be noted that the first body 110 is omitted in FIG. 6 to facilitate the identification of the counterweight wheel 140 and the carrier 150. At this time, the first body 110 can be shown in FIG. 5A, which shows that the first body 110 has also been turned 180 degrees and attached to the lower surface S2 of the second body 120. That is, in one of the operating modes, the foldable electronic device 100 may be converted from the 0-degree state to the 360-degree state by respectively turning the first body 110 and the second body 120 180 degrees.

In this embodiment, because the pivot joint (the pivot shaft 142) between the counterweight wheel 140 and the second body 120 is eccentric to the gravity center C1 of the counterweight wheel 140, the counterweight wheel 140 relative to the pivot joint (the pivot shaft 142) generates torque for rotation by the gravity G. As can be seen from FIG. 6, when the foldable electronic device 100 is converted from the 0-degree state to the 360-degree state, the counterweight wheel 140 drives the second magnet M2 to move away from the upper surface S1 and move closer to the lower surface S2, while the end portion 144 moves closer to the lower surface S2 and moves away from the upper surface S1, and the gravity center C1 moves away from the lower surface S2 and moves closer to the upper surface S1. Here, a rotation direction of the counterweight wheel 140 is consistent with a rotation direction of the carrier 150. On the contrary, if the foldable electronic device 100 is converted back to the 0-degree state from the 360-degree state, the counterweight wheel 140 drives the second magnet M2 to move away from the lower surface S2 and move closer to the upper surface S1.

It should be noted that the below figure in FIG. 6 is shown in FIG. 5A (here, the rectangular coordinates X-Y-Z are the same as each other). At this time, the gravity center C1 of the counterweight wheel 140 has not moved below the pivot shaft 142, which may be achieved by two methods. First, the counterweight wheel 140 is maintained in the state shown in FIG. 5A by a structural stop, that is, the vertical wall 122*a* of the second body 120 or an inner side surface 122*b* of the case 122 stops the relevant moving components (the counterweight wheel 140 and the carrier 150). The other method is to make the magnetic attracting force generated by the first magnet M1 and the second magnet M2 greater than a sum of a weight of the second magnet M2 and a weight of the counterweight wheel 140. Furthermore, in the state shown in FIG. 4A or FIG. 5A, the weight of the counterweight wheel 140 is greater than a sum of a weight of the carrier 150 and the weight of the second magnet M2, which also helps to avoid an insufficiency or disappearance of the magnetic attracting force of the first magnet M1 as the second magnet M2 is far away.

Please refer to FIG. 6 again. Through the simple view on the right side in FIG. 6, motion trajectories of the counterweight wheel 140 and the carrier 150 are matched with the rectangular coordinates X-Y-Z (same as FIG. 5A) and described as follows:

In this embodiment, the pivot joint between the end portion 144 and the carrier 150 relative to the pivot joint (that is, the pivot shaft 152) between the carrier 150 and the second body 120 forms a second circular motion (with a trajectory L2), and the pivot joint between the end portion 144 and the carrier 150 relative to the pivot joint (that is, the pivot shaft 142) between the counterweight wheel 140 and the second body 120 forms a first circular motion (with a trajectory L1), where a trajectory radius of the first circular motion is smaller than a trajectory radius of the second circular motion. Furthermore, orthographic projections of the trajectory L1 of the first circular motion and the trajectory L2 of the second circular motion on a Y-Z plane intersect at two points, where one of the points is a position (the top figure in FIG. 6) of the pivot joint between the end portion 144 and the carrier 150 in the 0-degree state, and the other point is a position of the pivot joint between the end portion 144 and the carrier 150 in the 360-degree state (the below figure in FIG. 6).

In summary, in the aforementioned embodiments of the disclosure, a foldable electronic device is provided with a rotatable counterweight wheel in a second body, and a pivot joint between a counterweight wheel and the second body is eccentric to a gravity center of the counterweight wheel, so that the counterweight wheel is rotated by gravity in response to the posture of the second body. Furthermore, the foldable electronic device also dispose a rotatable carrier in the second body, and a second magnet is disposed in the carrier, so that an end portion of the counterweight wheel is connected to the carrier. Accordingly, the posture of the second body may drive the counterweight wheel to rotate by gravity so as to drive the carrier to rotate, thereby making the second magnet on the carrier move closer to or move away from the two opposite surfaces of the body.

At the same time, the rotation of the aforementioned carrier may further be combined with the first magnet disposed in the first body, so that when the first magnet is stacked on the upper surface or the lower surface of the second body along with the first body, the second magnet may also move closer to the upper surface or the lower surface correspondingly. Therefore, the first magnet and the second magnet keep within the distance where the magnetic attracting force may start normally, ensuring that the magnetic attracting force maintain the aforementioned stacking state. Accordingly, the movable magnet driving mechanism may effectively save the space required for disposing components, so that when the body is in different folding states, enough magnetic attracting force attracts the body together without causing the body to fall apart.

What is claimed is:

1. A foldable electronic device, comprising:
a first body;
a first magnet, disposed in the first body;
a second body;
a hinge, connected to the first body and the second body, so that the first body and the second body are rotated relatively by the hinge to be folded and unfolded, and are converted between a 0-degree state and a 360-degree state, wherein in the 0-degree state, the first body is stacked on an upper surface of the second body, the first magnet is adjacent to the upper surface and away from a lower surface of the second body, in the 360-degree state, the first body is stacked on the lower surface, the first magnet is adjacent to the lower surface and away from the upper surface, and the upper surface and the lower surface are two opposite surfaces of the second body;
a counterweight wheel, pivoted to the second body, wherein a pivot joint between the counterweight wheel and the second body is eccentric to a gravity center of the counterweight wheel;
a carrier, pivoted to the second body, wherein an end portion of the counterweight wheel is connected to the carrier, and the pivot joint between the counterweight wheel and the second body is located between the end portion and the gravity center; and
a second magnet, disposed in the carrier,
wherein the counterweight wheel is rotated in the second body by gravity in response to a posture of the second body, and drives the carrier and the second magnet to rotate in the second body, in a process of being converted from the 0-degree state to the 360-degree state, the counterweight wheel drives the second magnet to move away from the upper surface and move closer to the lower surface, in a process of being converted from the 360-degree state to the 0-degree state, the counterweight wheel drives the second magnet to move away from the lower surface and move closer to the upper surface, and the first magnet and the second magnet move closer to each other to generate a magnetic attracting force.

2. The foldable electronic device according to claim 1, wherein in the 0-degree state, the foldable electronic device abuts a platform by the lower surface of the second body, in which the foldable electronic device is placed on the platform, the upper surface is away from the platform, in the 360-degree state, the foldable electronic device abuts the platform by the upper surface of the second body, and the lower surface is away from the platform.

3. The foldable electronic device according to claim 1, wherein the counterweight wheel has a wheel and a connecting arm extending from the wheel and protruding outside the wheel, the end portion is located on the connecting arm and outside the wheel, and the end portion is pivoted to the carrier.

4. The foldable electronic device according to claim 3, wherein a pivot shaft between the counterweight wheel and the second body, a pivot shaft between the carrier and the second body, and a pivot shaft between the end portion and the carrier are parallel to and different from each other.

5. The foldable electronic device according to claim 1, wherein the pivot joint between the end portion and the carrier relative to the pivot joint between the carrier and the second body forms a second circular motion, the pivot joint between the end portion and the carrier relative to the pivot joint between the counterweight wheel and the second body forms a first circular motion, and a trajectory radius of the first circular motion is smaller than a trajectory radius of the second circular motion.

6. The foldable electronic device according to claim 5, wherein orthographic projections of a trajectory of the first circular motion and a trajectory of the second circular motion on a plane intersect at two points, one of the two points is a position of the pivot joint between the end portion and the carrier in the 0-degree state, the other point is a position of the pivot joint between the end portion and the carrier in the 360-degree state.

7. The foldable electronic device according to claim 1, wherein when being converted from the 0-degree state to the 360-degree state, the end portion of the counterweight wheel moves closer to the lower surface and moves away from the upper surface, and the gravity center of the counterweight wheel moves away from the lower surface and moves closer to the upper surface.

8. The foldable electronic device according to claim 1, wherein a rotation direction of the counterweight wheel is consistent with a rotation direction of the carrier.

9. The foldable electronic device according to claim 1, wherein a weight of the counterweight wheel is greater than a sum of a weight of the carrier and a weight of the second magnet.

10. The foldable electronic device according to claim 1, wherein the magnetic attracting force generated by the first magnet and the second magnet is greater than a sum of a weight of the second magnet and a weight of the counterweight wheel.

* * * * *